(12) United States Patent
Ikeda

(10) Patent No.: US 7,082,571 B2
(45) Date of Patent: Jul. 25, 2006

(54) MAP DISPLAY METHOD, MAP DISPLAY DEVICE AND MAP DISPLAY SYSTEM

(75) Inventor: Hidekazu Ikeda, Chiba (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 10/218,208

(22) Filed: Aug. 13, 2002

(65) Prior Publication Data

US 2003/0036846 A1  Feb. 20, 2003

(30) Foreign Application Priority Data

Aug. 15, 2001  (JP) ............................. 2001-246593

(51) Int. Cl.
G06F 15/00 (2006.01)
G06F 19/00 (2006.01)

(52) U.S. Cl. .................. 715/712; 715/714; 701/206

(58) Field of Classification Search ................ 715/854, 715/764, 853, 712, 714, 761, 762, 763; 701/200, 701/202, 206, 208
See application file for complete search history.

(56) References Cited

U.S. PATENT DOCUMENTS

| 5,471,205 | A | 11/1995 | Izawa | |
| 5,802,492 | A | 9/1998 | DeLorme et al. | |
| 6,256,581 | B1 * | 7/2001 | Fujii et al. | 701/202 |
| 6,336,073 | B1 * | 1/2002 | Ihara et al. | 701/202 |
| 6,515,595 | B1 * | 2/2003 | Obradovich et al. | 340/905 |
| 6,697,731 | B1 * | 2/2004 | Takayama et al. | 701/200 |
| 6,892,135 | B1 * | 5/2005 | Krull et al. | 701/211 |

OTHER PUBLICATIONS

Patent Abstracts of Japan vol. 1995, No. 03, Apr. 28, 1995 & JP 6 331371 A (Toshiba Corp), Dec. 2, 1994.
Patent Abstracts of Japan vol. 2000, No. 09, Oct. 13, 2000 & JP 2000 180192 A (Aisin AW CO LTD; Toyota Motor Corp; Denso Corp; Fujitsu Ten LTD; MATSU), Jun. 30, 2000.

* cited by examiner

*Primary Examiner*—Cao (Kevin) Nguyen
(74) *Attorney, Agent, or Firm*—Frommer Lawrence & Haug LLP; William S. Frommer; Paul A. Levy

(57) ABSTRACT

A map display method, a map display device and a map display system which improve visibility by changing its display mode when a map is to be displayed on the screen. A predetermined map is displayed on the screen, a route is specified on the map displayed on the screen, the area having a predetermined width of this specified route is displayed clearly, and the other area is displayed less clearly.

27 Claims, 7 Drawing Sheets

(REGULAR ROUTE DISPLAY PICTURE)

(DISPLAY PICTURE WHICH DISPLAYS AN AREA OTHER THN THE ROUTE FAINTRY)

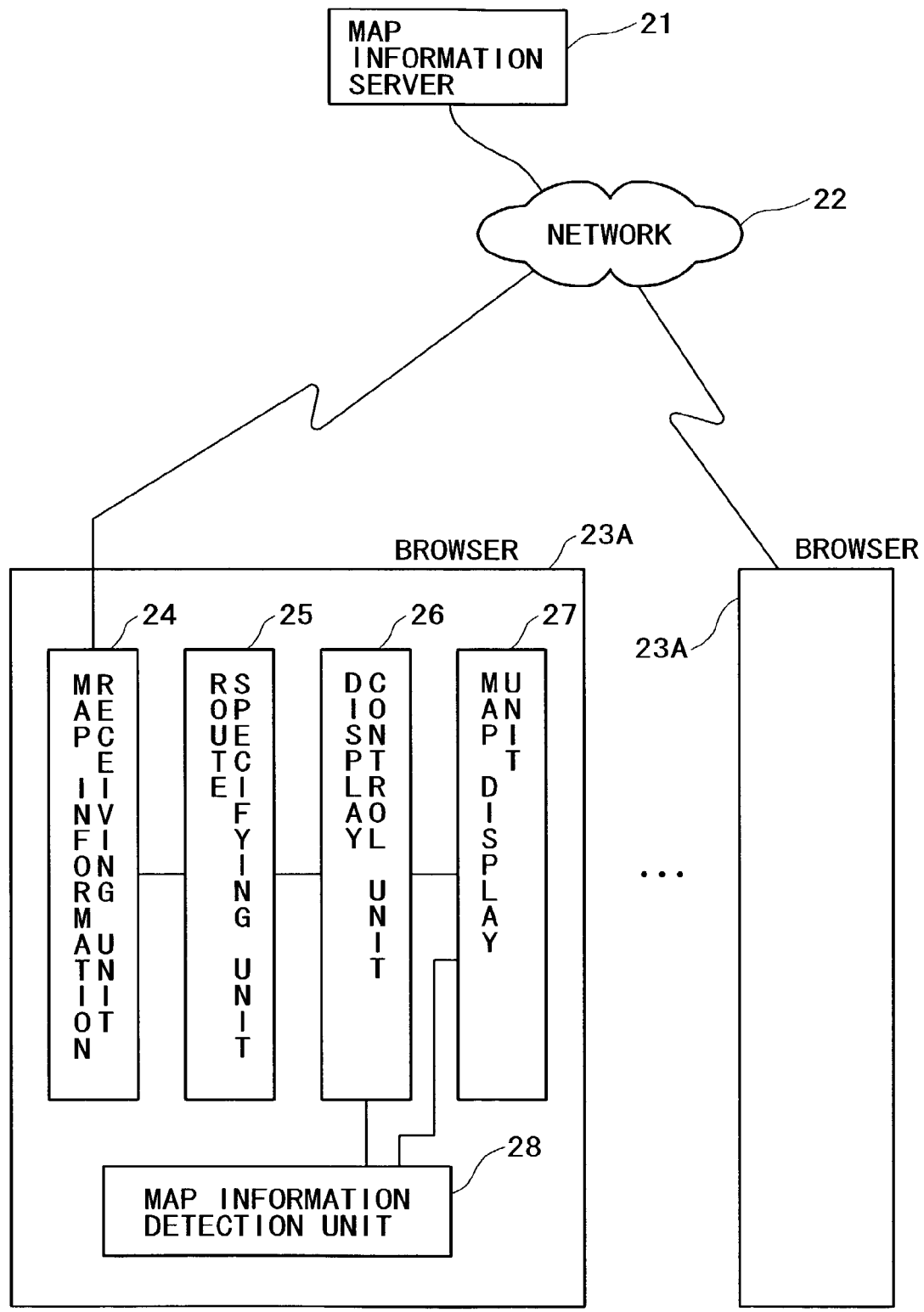

MAP DISPLAY METHOD, MAP DISPLAY DEVICE AND MAP DISPLAY SYSTEM

BACKGROUND OF THE INVENTION

1. Field of the Invention

The present invention relates to a map display method, a map display device and a map display system and, specifically, to a map display method, a map display device and a map display system all of which improve the visibility of a route on a map displayed on a screen.

2. Description of Related Art

As means of displaying map information in the prior art, in general, desired map information is displayed on a predetermined display device and enlarged or reduced, or the destination on the displayed map is enclosed with a square or specified by a pointer so that a user can easily recognize it.

A technique of displaying a route on a map by inputting the address of a destination or the name of a place is widely and generally employed in car navigation systems making use of GPS (Global Positioning System).

Although the route is shown on the map displayed on the screen in most cases as described in the prior art, there is a problem that when a lot of information such as the names of places and the names of buildings are shown on the map, it is difficult to recognize the route.

SUMMARY OF THE INVENTION

It is therefore an object of the present invention to provide a map display method, device and system all of which improve the visibility of the specified route when the route is specified on the map.

According to the present invention, the above object is attained by a map display method, a map display device and a map display system constituted as described below.

According to a first aspect of the present invention, there is provided a map display method having the steps of: displaying a predetermined map on a screen; specifying a route on the map displayed on the screen; and displaying the area having a predetermined width of the specified route clearly and the other area less clearly.

According to a second aspect of the present invention, there is provided a map display method, wherein the area having a predetermined width of the route can be suitably changed.

According to a third aspect of the present invention, there is provided a map display method, wherein the area having a predetermined width of the specified route is changed to include a landmark existent in the vicinity of the route.

According to a fourth aspect of the present invention, there is provided a map display method, wherein the area having a predetermined width of the specified route is displayed clearly, the other area is displayed less clearly, and a landmark is displayed clearly.

According to a fifth aspect of the present invention, there is provided a map display method having the steps of: detecting information on the position of a device and displaying a map capable of displaying the detected information on a screen; specifying a route on the map displayed on the screen; and displaying the area having a predetermined width of the specified route clearly and the other area less clearly.

According to a sixth aspect of the present invention, there is provided a map display method, wherein the area having a predetermined width of the route can be suitably changed.

According to a seventh aspect of the present invention, there is provided a map display method, wherein the area having a predetermined width of the specified route is changed to include a landmark existent in the vicinity of the route.

According to an eighth aspect of the present invention, there is provided a map display method, wherein the area having a predetermined width of the specified route is displayed clearly, the other area is displayed less clearly, and a landmark is displayed clearly.

According to a ninth aspect of the present invention, there is provided a map display method, wherein when a device is moved along the route, the area having a predetermined width of the route is enlarged along with the movement.

According to a tenth aspect of the present invention, there is provided a map display device having: map display means capable of displaying a predetermined map on a screen; route specifying means for specifying a route on the map displayed on the screen; and display control means for displaying the area having a predetermined width of the specified route clearly and the other area less clearly.

According to an eleventh aspect of the present invention, there is provided a map display device, wherein the display control means can change the area having a predetermined width of the route suitably.

According to a twelfth aspect of the present invention, there is provided a map display device, wherein the display control means changes the area having a predetermined width of the specified route to include a landmark existent in the vicinity of the route.

According to a thirteenth aspect of the present invention, there is provided a map display device, wherein the display control means displays the area having a predetermined width of the specified route clearly, the other area less clearly and a landmark clearly.

According to a fourteenth aspect of the present invention, there is provided a map display device having: map display means for detecting information on the position of the device and displaying a map capable of displaying the detected information on a screen; route specifying means for specifying a route on the map displayed on the screen; and display control means for displaying the area having a predetermined width of the specified route clearly and the other area less clearly.

According to a fifteenth aspect of the present invention, there is provided a map display device, wherein the display control means can change the area having a predetermined width of the route suitably.

According to a sixteenth aspect of the present invention, there is provided a map display device, wherein the display control means changes the area having a predetermined width of the specified route to include a landmark existent in the vicinity of the route.

According to a seventeenth aspect of the present invention, there is provided a map display device, wherein the display control means displays the area having a predetermined width of the specified route clearly, the other area less clearly and a landmark clearly.

According to an eighteenth aspect of the present invention, there is provided a map display device, wherein the display control means enlarges and moves the area having a predetermined width of the route with the movement of the device along the route.

According to a nineteenth aspect of the present invention, there is provided a map display system having: a map information server which stores map information and can distribute it over a network; and browsers which receive map information over the network and have a map display unit for displaying the received map information, each of the browsers having: map information receiving means for receiving map information over the network; route specifying means for specifying a route on the received map information; display control means for displaying the area of the specified route clearly and the other area less clearly; and map display means for displaying map information having the specified route.

According to a twentieth aspect of the present invention, there is provided a map display system, wherein the display control means can change the area having a predetermined width of the route suitably.

According to a twenty-first aspect of the present invention, there is provided a map display system, wherein the display control means changes the area having a predetermined width of the specified route to include a landmark existent in the vicinity of the route.

According to a twenty-second aspect of the present invention, there is provided a map display system, wherein the display control means displays the area having a predetermined width of the specified route clearly, the other area less clearly and a landmark clearly.

According to a twenty-third aspect of the present invention, there is provided a map display system having: a map information server which stores map information and can distribute it over a network; and browsers which receive map information over the network and have a map display unit for displaying the received map information, each of the browsers having: map information receiving means for receiving map information over the network; map display means for detecting information on the position of the system and displaying a map capable of displaying the detected information on a screen; route specifying means for specifying a route on the map displayed on the screen; and display control means for displaying the area having a predetermined width of the specified route clearly and the other area less clearly.

According to a twenty-fourth aspect of the present invention, there is provided a map display system, wherein the display control means can change the area having a predetermined width of the route suitably.

According to a twenty-fifth aspect of the present invention, there is provided a map display system, wherein the display control means changes the area having a predetermined width of the specified route to include a landmark existent in the vicinity of the route.

According to a twenty-sixth aspect of the present invention, there is provided a map display system, wherein the display control means displays the area having a predetermined width of the specified route clearly, the other area less clearly and a landmark clearly.

According to a twenty-seventh aspect of the present invention, there is provided a map display system, wherein the display control means enlarges and moves the area having a predetermined width of the route with the movement of the system along the route.

Thus, when a route is input into the map displayed on the screen, the area having a predetermined width of the route is displayed clearly and the other area is displayed less clearly, thereby making it easy to see the desired route and making it possible to improve visibility.

In a system having a screen having the function of detecting information on its position and capable of displaying a map, when a route is specified, the display of information on its position and the area having a predetermined width of the route is changed to make it easy to see the map while moving and improve the visibility of the route.

Other and further objects, features and advantages of the invention will appear more fully from the following description.

BRIEF DESCRIPTION OF THE DRAWINGS

FIG. 7 is a schematic whole structural diagram of a map display system according to another embodiment of the present invention.

DETAILED DESCRIPTION OF THE PREFERRED EMBODIMENTS

A map display method, a map display device and a map display system according to preferred embodiments of the present invention will be described herein under with reference to the accompanying drawings.

A map display device which can carry out the map display method of the present invention has: a map information database 11 for storing map information; a route specifying unit 12 as route specifying means for specifying a route on map information extracted from the map information database 11; a display control unit 13 as display control means for controlling to display the area having a predetermined width of the specified route clearly and the other area less clearly; and a map display unit 14 for displaying the specified map information, the area having a predetermined width of the specified route clearly and the other area less clearly.

The area of the route can be displayed clearly by controlling the display screen of the device, setting the screen bright in advance, or directly without controlling the screen.

The control of the display screen to display the other area less clearly is to display the other area faintly to such an extent that it is difficult to see, it is indistinct, it can hardly be seen, it cannot be completely seen, or the like.

In short, the area having a predetermined width of the specified route and the other area are displayed in such a manner that they can be distinguished from each other in order to improve the visibility of the route.

The route specifying unit 12 sets a route by inputting the address of a destination or the name of a place using an unshown operation button or remote control.

The display control unit 13 controls to display the area having a predetermined width of the route specified by the route specifying unit 12 clearly and the other area less clearly. This area having a predetermined width can be made narrow or wide according to map information when it includes labyrinthine buildings or roads.

Figure 1:
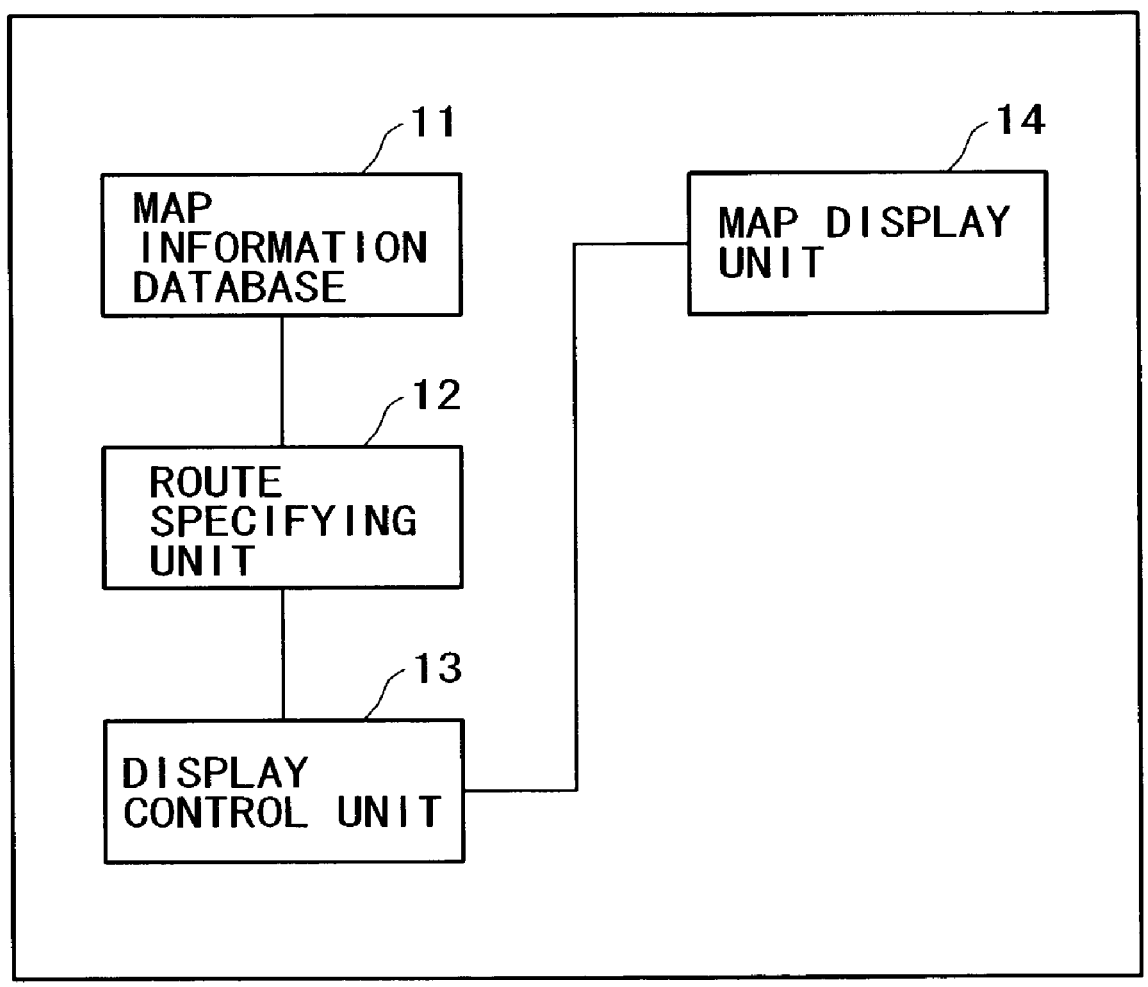
FIG. 1 is a schematic whole structural diagram of a map display device according to an embodiment of the present invention.
Figure 2:
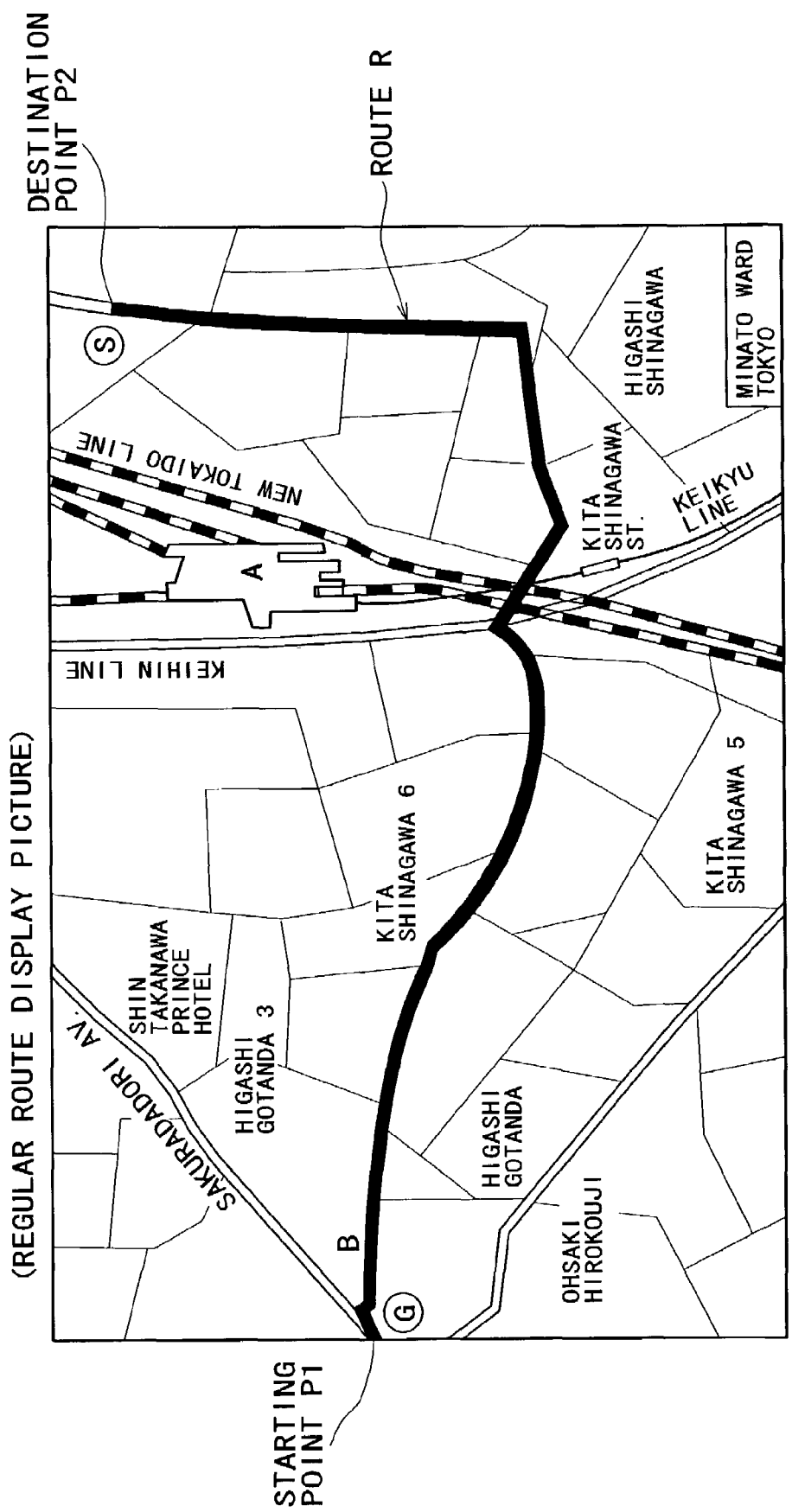
FIG. 2 is a diagram of a sample of a regular route display picture displayed on the screen of the device of FIG. 1.

This will be described with reference to drawings. FIG. 2 shows the regular display of a map without adding display control. Information "from the starting point P1 to the destination P2" is added to the map by a user and a route R is thereby displayed.

Figure 3:
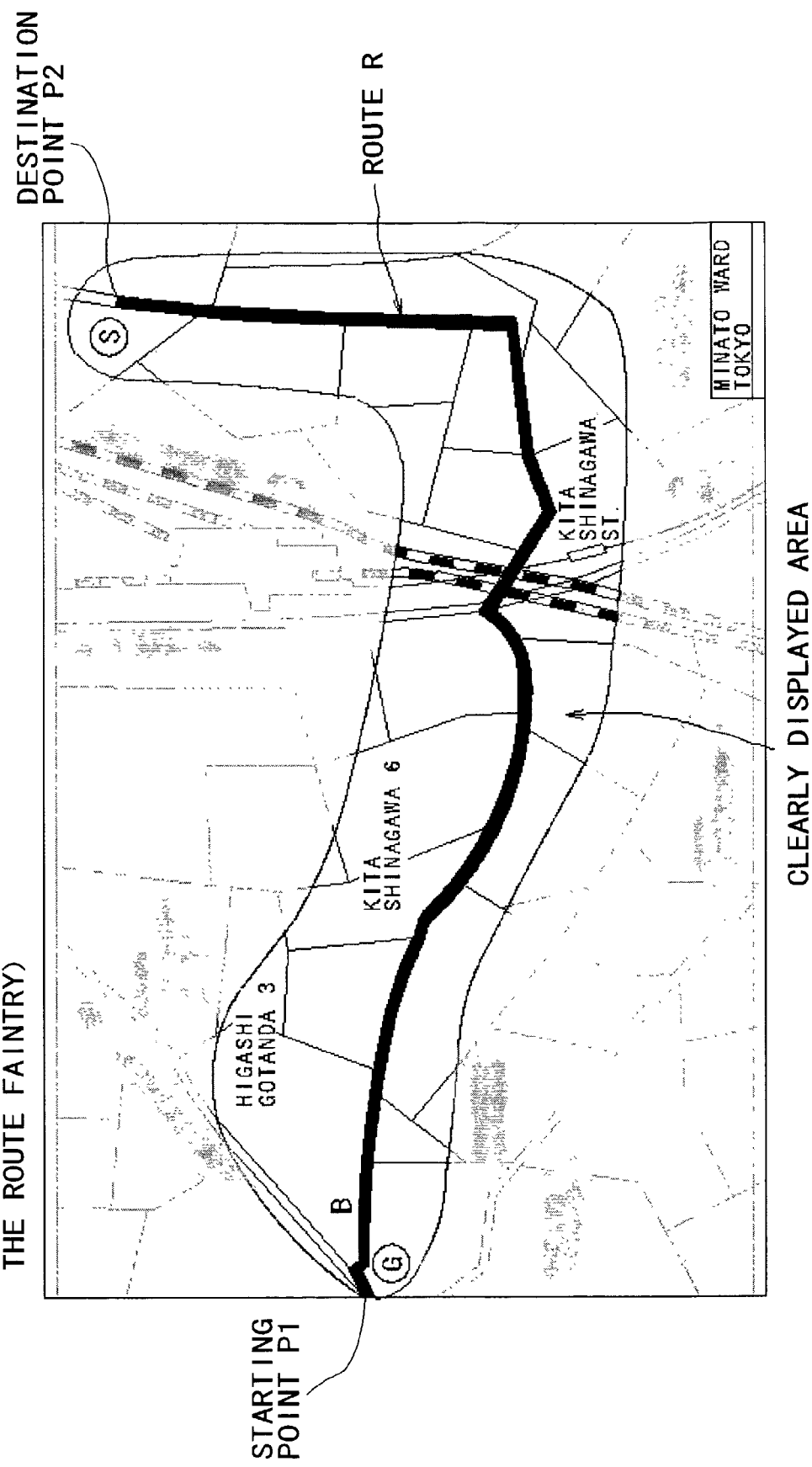
FIG. 3 is a diagram of a sample which displays the route in FIG. 2 and its vicinity clearly and the other area less clearly.

On the map of FIG. 3, the area having a predetermined width of the route R is displayed clearly and the other area is displayed less clearly by display control. The positional relationship of the route R can be specified by placing a station B within the predetermined width.

Figure 4:
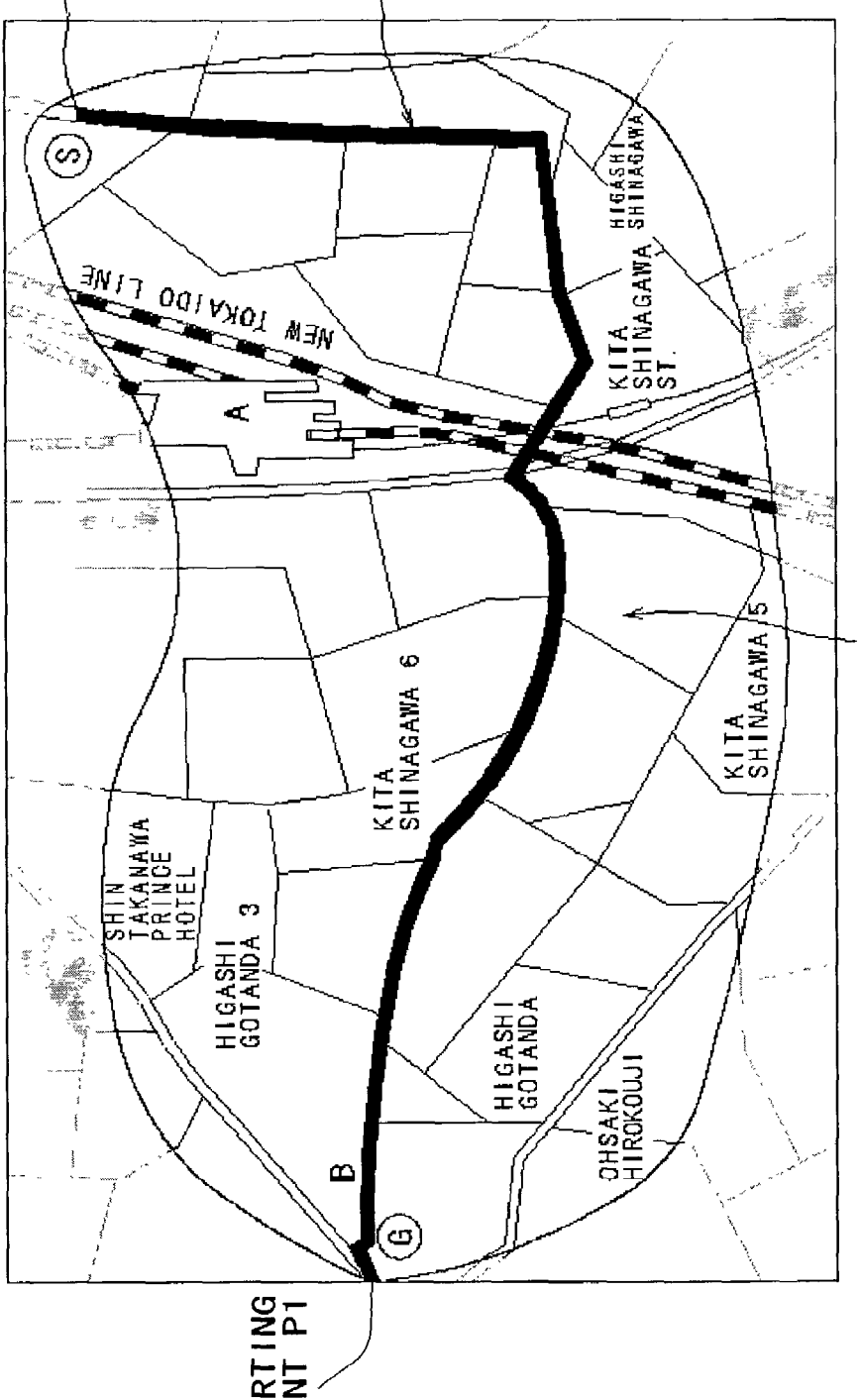
FIG. 4 is a diagram of a sample which changes the display mode of FIG. 3.

On the map of FIG. 4, the area having a predetermined width is widened. The entire positional relationship can be known clearly by placing stations A and B within the predetermined width.

Thus, a map having high visibility can be displayed by changing the predetermined width as well as the display mode.

Another embodiment of a map display device having the function of detecting information on its position will be described with reference to the accompanying drawing.

Figure 5:
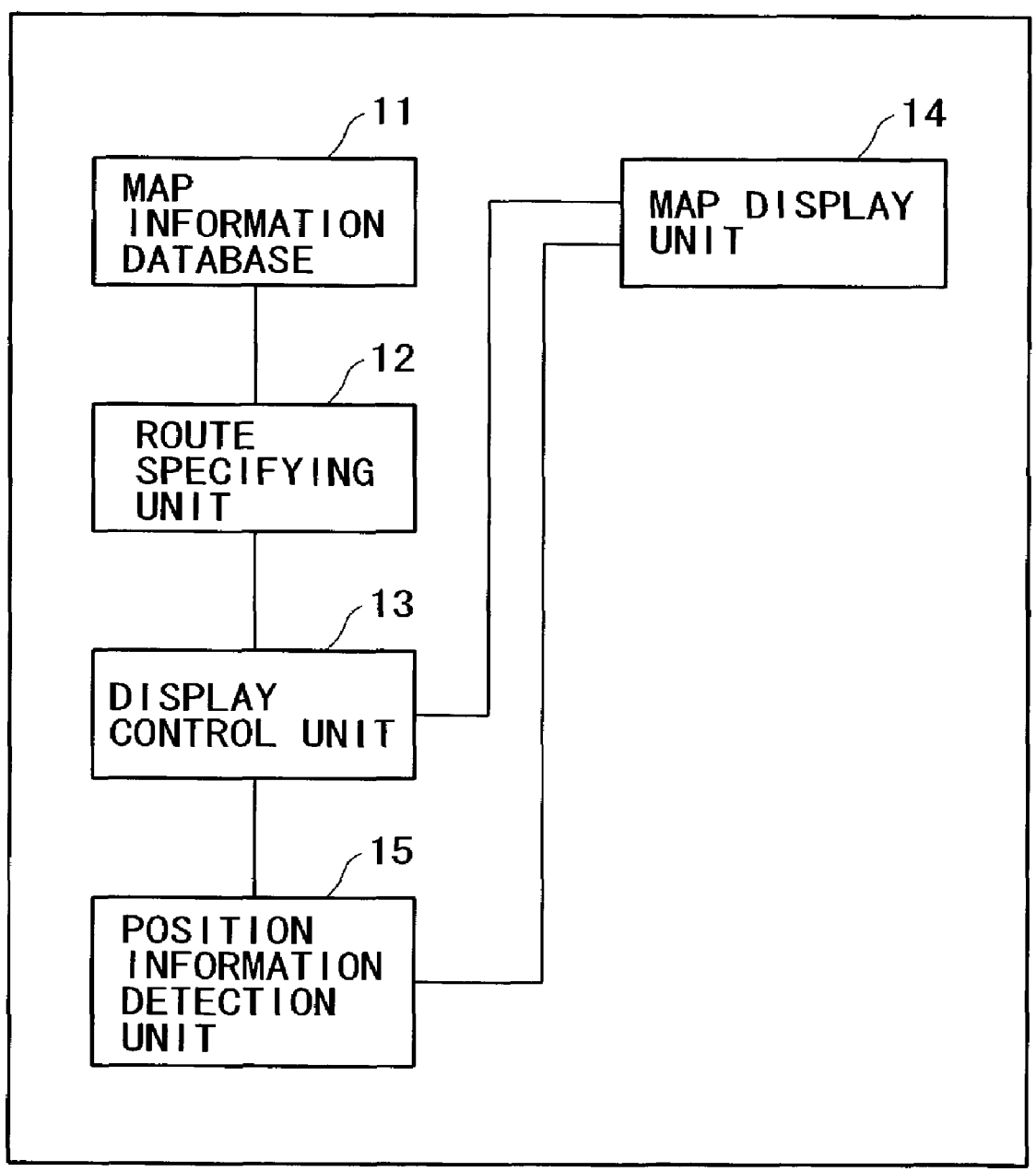
FIG. 5 is a schematic whole structural diagram of a map display device according to another embodiment of the present invention.

As shown in FIG. 5, the map display device having the function of detecting information on its position has: a map information database 11 for storing map information; a route specifying unit 12 as route specifying means for specifying a route on map information extracted from the map information database 11; a display control unit 13 as display control means for controlling to display the area having a predetermined width of the specified route clearly and the other area less clearly; a map display unit 14 for displaying the specified map information, the area having a predetermined width of the specified route clearly and the other area less clearly; and a position information detection unit 15 for detecting information on its position.

The route specifying unit 12 sets a route by inputting the address of a destination or the name of a place using an unshown operation button or remote control.

The display control unit 13 displays a desired map on the screen and controls to display the area having a predetermined width of the route specified by the route specifying unit 12 clearly and the other area less clearly. This area having a predetermined width can be set narrow or wide according to map information when it includes labyrinthine buildings or roads.

The position information detection unit 15 has the function of detecting information on the position of the device, for example, GPS to detect information on the position of the device.

The map display device constituted as described above displays a map which can display the detected information on its position on the screen of the map display unit 14 and specifies the route on the map displayed on the screen by operating the unshown operation button of the route specifying unit 12. Then, the area having a predetermined width of the specified route is displayed clearly and the other area is displayed less clearly. This display mode can be changed. That is, as shown in FIG. 3 and FIG. 4, the area of the route can be enlarged or reduced.

The display control unit 13 specifies a particular point, for example, "A" in FIG. 3 on the displayed map, or specifies a landmark and displays the landmark clearly when the map is displayed previously, or changes the area of the route to an area including this landmark and displays it clearly.

When a particular route is specified on the map displayed on the screen, the predetermined area of the route can be displayed clearly. In this embodiment, when the device is moved along the specified route, the area to be displayed clearly can be enlarged along with the movement of the device to follow the movement by making use of the function of detecting information on the position of the device. Thus, the device becomes easy to use and easy to see by enlarging the clearly displayed area in the moving direction of the moving device, preferably the area in front of the device in the moving direction, thereby improving visibility.

A description is subsequently given of an embodiment of a map display system using this map display device with reference to the accompanying drawing.

Figure 6:
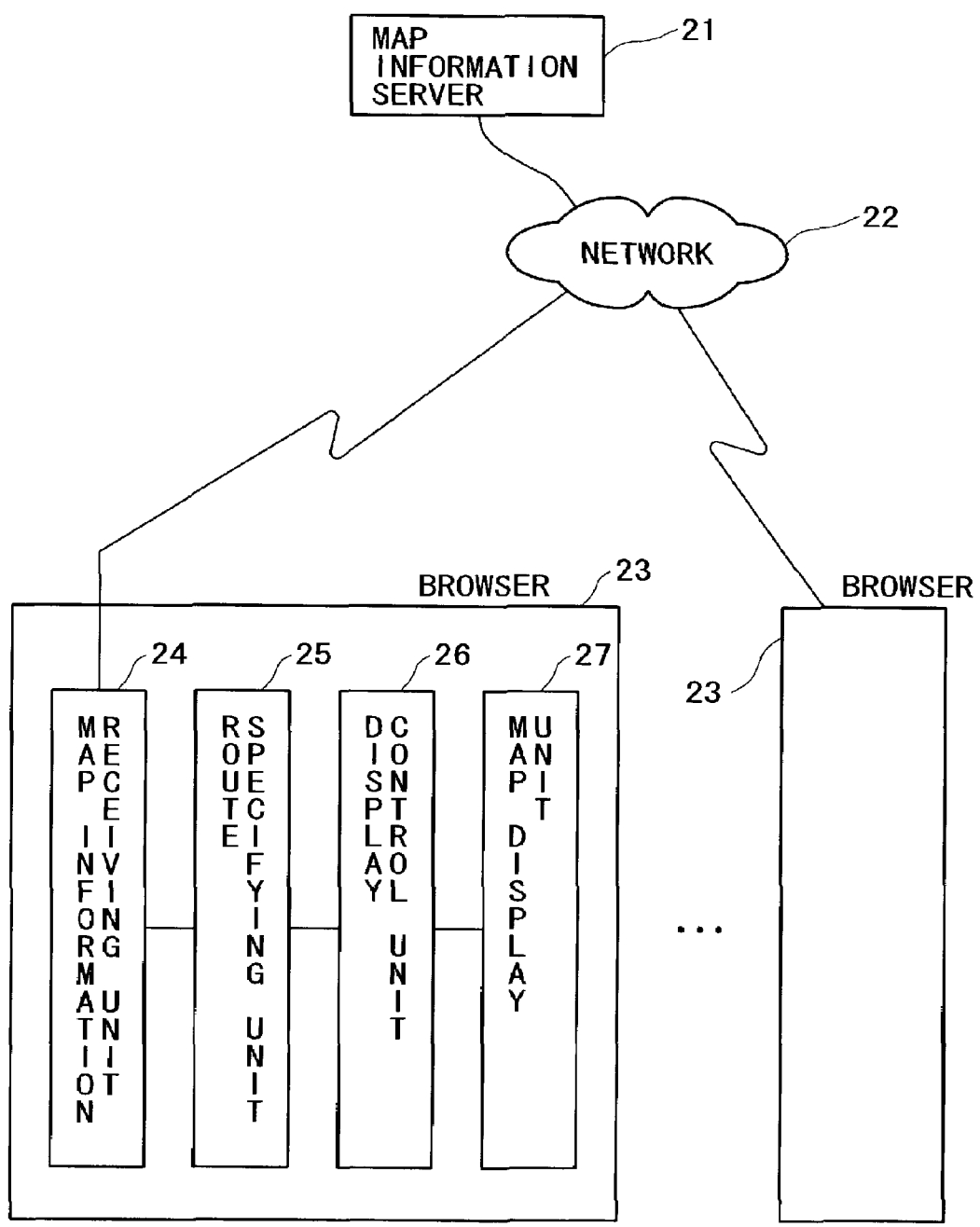
FIG. 6 is a schematic whole structural diagram of a map display system according to an embodiment of the present invention.

As shown in FIG. 6, the map display system has a map information server 21 which stores map information and can distribute it over a network, and browsers 23, . . . 23 which receive map information over the network 22 such as Internet and comprise a map display unit for displaying the received map information.

Each of the browsers 23 is a so-called map display device, can be implemented by a portable telephone, PDA, personal computer or the like and has a map information receiving unit 24 for receiving map information over the network 22, a route specifying unit 25 for specifying a route on the received map information, a display control unit 26 for displaying the area of the specified route clearly and the other area less clearly, and a map display unit 27 for displaying map information having the specified route.

In this constitution, when a map is to be displayed, the browser 23 accesses the map information server 21 over the network to receive desired map information. The received map information is input into the map information receiving unit 24 and a route is specified by the operation of the browser 23.

When the route is specified, the display control unit 26 displays the area of the specified route clearly and the other area less clearly. The area having a predetermined width of this route can be suitably changed. This area of the route can be enlarged or reduced like the area shown in FIG. 3 and FIG. 4.

The display control unit 26 changes the area having a predetermined width of the specified route to include a landmark existent in the vicinity of the route. For example, when "A" is displayed faintly in FIG. 3, the area is enlarged up to "A" to display "A" clearly. This landmark may be preset or may be set with reference to the displayed map.

Further, instead that the area having a predetermined width of the specified route is displayed clearly and the other area is displayed less clearly, a landmark can be displayed clearly. When the device is controlled as described above, the preset landmark or the set landmark is displayed clearly as well as the route, thereby making it easy to recognize the route and making it possible to improve visibility.

A description is subsequently given of another embodiment of a map display system having the function of detecting information on its position with reference to the accompanying drawing.

As shown in FIG. 7, the map display system having the function of detecting information on its position has a map information server 21 which stores map information and can distribute it over a network 22 such as Internet, and browsers 23A, . . . 23A which receive map information over the network 22, have the function of detecting information on the position of the system and comprise a map display unit for displaying the received map information.

Each of the browsers 23A is a so-called map display device, can be implemented by a portable telephone, PDA, personal computer or the like and has a map information receiving unit 24 for receiving map information over the network 22, a route specifying unit 25 for specifying a route on the received map information, a display control unit 26 for displaying the area of the specified route clearly and the other area less clearly, a map display unit 27 for displaying map information having the specified route, and a position information detection unit 28 capable of detecting information on the position of the system using GPS or the like.

In this constitution, the browser 23A accesses the map information server 21 over the network 22 to receive desired map information when a map is to be displayed. The received map information is input into the map information receiving unit 24 and a route is specified by the operation of the browser 23A.

When the route is specified, the display control unit 26 displays the area of the specified route clearly and the other area less clearly. The area having a predetermined width of the route can be suitably changed. This display mode is the same as in FIG. 3 and FIG. 4, and the area of the route can be enlarged or reduced. When the map displayed on the screen is the map of the area including information on the position of the system, the position of the system can be displayed on the map.

The display control unit 26 changes the area having a predetermined width of the specified route to an area including a landmark existent in the vicinity of the route. For example, when "A" is displayed faintly in FIG. 3, the area is enlarged up to "A" to display "A" clearly. This landmark can be preset or may be set with reference to the displayed map.

Further, instead that the area having a predetermined width of the specified route is displayed clearly and the other area is displayed less clearly, a landmark can be displayed clearly. When the device is controlled as described above, the preset landmark or the set landmark is displayed clearly as well as the route, thereby making it easy to recognize the route and making it possible to improve visibility.

When a particular route is specified on the map displayed on the screen, the browser 23A can display the predetermined area of the route clearly. In this embodiment, when the system is moved along the specified route, the area to be displayed clearly can be unchanged or enlarged along with the movement of the system to follow the movement by making use of the function of detecting information on the position of the system. Thereby, the device becomes easy to use and easy to see by enlarging the clearly displayed area in the moving direction of the moving system, preferably the area in front of the system in the moving direction, thereby improving visibility.

As described above, when a route is specified on the displayed map, the map display method and map display device according to the present invention display the specified route clearly, thereby making it easy to recognize the route without being bothered with the names of places and buildings included in the map.

The foregoing invention has been described in terms of preferred embodiments. However, those skilled, in the art will recognize that many variations of such embodiments exist. Such variations are intended to be within the scope of the present invention and the appended claims.

What is claimed is:

1. A map display method comprising the steps of:
    displaying a predetermined map on a screen;
    specifying a route on the map displayed on the screen; and
    displaying with first visibility and acuity an area on or about the specified route and displaying the remainder of said map with second visibility and acuity less than said first visibility and acuity such that said remainder of said map is difficult to see.

2. The map display method of claim 1, wherein a width of the area on or about the specified route can be suitably changed.

3. The map display method of claim 1, wherein a width of the area on or about the specified route is changed to include a landmark existent in the vicinity of the route.

4. The map display method of claim 1, wherein a landmark existent in the vicinity of the specified route is displayed with the first visibility and acuity.

5. A map display method comprising the steps of:
    detecting information on the position of a device and displaying a map capable of displaying the detected information on a screen;
    specifying a route on the map displayed on the screen; and
    displaying with first visibility and acuity an area on or about the specified route and displaying the remainder of said map with second visibility and acuity less than said first visibility and acuity such that said remainder of said map is difficult to see.

6. The map display method of claim 5, wherein a width of the area on or about the specified route can be suitably changed.

7. The map display method of claim 5, wherein a width of the area on or about the specified route is changed to include a landmark existent in the vicinity of the route.

8. The map display method of claim 5, wherein a landmark existent in the vicinity of the specified route is displayed with the first visibility and acuity.

9. The map display method of claim 5, wherein when the device is moved along the specified route, the area on or about the specified route is enlarged along with the movement.

10. A map display device comprising:
    map display means capable of displaying a predetermined map on a screen;
    route specifying means for specifying a route on the map displayed on the screen; and
    display control means for displaying with first visibility and acuity an area on or about the specified route and displaying the remainder of said map with second visibility and acuity less than said first visibility and acuity such that said remainder of said map is difficult to see.

11. The map display device of claim 10, wherein the display control means can change a width of the area in the vicinity of the specified route suitably.

12. The map display device of claim 10, wherein the display control means changes a width of the area on or about the specified route to include a landmark existent in the vicinity of the route.

13. The map display device of claim 10, wherein the display control means displays a landmark existent in the vicinity of the specified route with the first visibility and acuity.

14. A map display device comprising:
    map display means for detecting information on the position of a device and displaying a map capable of displaying the detected information on a screen;
    route specifying means for specifying a route on the map displayed on the screen; and
    display control means for displaying with first visibility and acuity an area on or about the specified route and displaying the remainder of said map with second visibility and acuity less than said first visibility and acuity such that said remainder of said map is difficult to see.

15. The map display device of claim 14, wherein the display control means can change a width of the area on or about the specified route suitably.

16. The map display device of claim 14, wherein the display control means changes a width of the area on or about the specified route to include a landmark existent in the vicinity of the route.

17. The map display device of claim 14, wherein the display control means displays a landmark existent in the vicinity of the specified route with the first visibility and acuity.

18. The map display device of claim 14, wherein the display control means enlarges and moves a width of the area on or about the specified the route with the movement of the device along the route.

19. A map display system comprising:

a map information server which stores map information and can distribute said map information over a network; and browsers that receive map information over the network and have a map display unit for displaying the received map information, each of the browsers comprising:

map information receiving means for receiving map information over the network;

route specifying means for specifying a route on the received map information;

display control means for displaying with first visibility and acuity an area on or about the specified route and displaying the remainder of said map with second visibility and acuity less than said first visibility and acuity such that said remainder of said map is difficult to see; and map display means for displaying map information having the specified route.

20. The map display system of claim 19, wherein the display control means can change a width of the area on or about the route suitably.

21. The map display system of claim 19, wherein the display control means changes a width of the area on or about the specified route to include a landmark existent in the vicinity of the route.

22. The map display system of claim 19, wherein the display control means displays a landmark existent in the vicinity of the specified route with the first visibility and acuity.

23. A map display system comprising:

a map information server which stores map information and can distribute said map information over a network; and browsers that receive map information over the network and have a map display unit for displaying the received map information, each of the browsers comprising:

map information receiving means for receiving map information over the network;

map display means for detecting information on the position of the system and displaying a map capable of displaying the detected information on a screen;

route specifying means for specifying a route on the map displayed on the screen; and display control means for displaying with first visibility and acuity an area on or about the specified route and displaying the remainder of said map with second visibility and acuity less than said first visibility and acuity such that said remainder of said map is difficult to see.

24. The map display system of claim 23, wherein the display control means can change a width of the area on or about the route suitably.

25. The map display system of claim 23, wherein the display control means changes a width of the area on or about the specified route to include a landmark existent in the vicinity of the route.

26. The map display system of claim 23, wherein the display control means displays a landmark existent in the vicinity of the specified route with the first visibility and acuity.

27. The map display system of claim 23, wherein the display control means enlarges and moves a width of the area on or about the specified the route with the movement of the device along the route.

* * * * *